(12) United States Patent
Sperle et al.

(10) Patent No.: US 9,082,088 B2
(45) Date of Patent: Jul. 14, 2015

(54) DYNAMIC ASSIGNMENT OF QUALIFICATION BLOCK TO PERSON

(75) Inventors: Robin Sperle, Mannheim (DE); Heinz Schillinger, Sinsheim (DE); Mathias Schoenecker, Hambrucken (DE)

(73) Assignee: SAP SE, Walldorf (DE)

( * ) Notice: Subject to any disclaimer, the term of this patent is extended or adjusted under 35 U.S.C. 154(b) by 1347 days.

(21) Appl. No.: 11/283,667

(22) Filed: Nov. 21, 2005

(65) Prior Publication Data

US 2007/0118511 A1 May 24, 2007

(51) Int. Cl.
*G06F 17/30* (2006.01)
*G06Q 10/06* (2012.01)

(52) U.S. Cl.
CPC .......... *G06Q 10/06* (2013.01); *G06F 17/30489* (2013.01); *G06F 17/30495* (2013.01); *G06F 17/30598* (2013.01)

(58) Field of Classification Search
CPC ............... G06F 17/30867; G06F 17/30495; G06F 17/30542; G06F 17/30
USPC .............................. 705/1.1–500; 707/705–708
See application file for complete search history.

(56) References Cited

U.S. PATENT DOCUMENTS

| | | | |
|---|---|---|---|
| 6,029,195 A | 2/2000 | Herz | |
| 6,275,812 B1 * | 8/2001 | Haq et al. | 705/11 |
| 6,289,340 B1 * | 9/2001 | Puram et al. | 707/5 |
| 6,385,620 B1 * | 5/2002 | Kurzius et al. | 1/1 |
| 6,524,109 B1 * | 2/2003 | Lacy et al. | 434/219 |
| 6,537,072 B2 * | 3/2003 | Kanevsky et al. | 434/219 |
| 6,618,723 B1 * | 9/2003 | Smith | 707/5 |
| 6,735,570 B1 * | 5/2004 | Lacy et al. | 705/7 |
| 7,054,821 B1 | 5/2006 | Rosenthal et al. | |
| 7,085,806 B1 * | 8/2006 | Shapira | 709/203 |
| 7,555,441 B2 * | 6/2009 | Crow et al. | 705/9 |
| 7,706,523 B2 | 4/2010 | Agusta | |
| 2002/0069080 A1 | 6/2002 | Roy et al. | |
| 2003/0009437 A1 | 1/2003 | Seiler et al. | |
| 2003/0078821 A1 * | 4/2003 | Gorur et al. | 705/7 |
| 2003/0083891 A1 | 5/2003 | Lang et al. | |
| 2003/0125970 A1 * | 7/2003 | Mittal et al. | 705/1 |
| 2003/0139953 A1 * | 7/2003 | Guenther et al. | 705/7 |
| 2003/0187723 A1 * | 10/2003 | Hadden et al. | 705/11 |
| 2004/0030566 A1 | 2/2004 | Brooks Rix | |
| 2005/0055226 A1 | 3/2005 | Dane et al. | |
| 2005/0149376 A1 * | 7/2005 | Guyan et al. | 705/9 |
| 2005/0267934 A1 | 12/2005 | Brown et al. | |
| 2006/0111932 A1 * | 5/2006 | Brown et al. | 705/1 |
| 2006/0178896 A1 | 8/2006 | Sproul | |
| 2006/0229896 A1 * | 10/2006 | Rosen et al. | 705/1 |
| 2007/0203772 A1 * | 8/2007 | Eun et al. | 705/8 |

OTHER PUBLICATIONS

U.S. Appl. No. 11/284,263, filed Nov. 21, 2005.
U.S. Appl. No. 11/283,668, filed Nov. 21, 2005.
"Webster's Third New international Dictionary of the English Language Unabridged", 1986, G. & C. Merriam Co., p. 1944).

* cited by examiner

*Primary Examiner* — Michelle Owyang
(74) *Attorney, Agent, or Firm* — Kenyon & Kenyon LLP

(57) ABSTRACT

A method for matching an object with a set of qualifications to an object with a set of requirements includes examining the object with the set of qualifications to produce a list of qualifications without a hierarchy, removing duplicate qualifications, and matching list of qualifications without a hierarchy with removed duplicates to the set of qualifications.

9 Claims, 4 Drawing Sheets

DYNAMIC ASSIGNMENT OF QUALIFICATION BLOCK TO PERSON

BACKGROUND

1. Technical Field

The present disclosure relates to qualification blocks and, more specifically, dynamic assignment of qualification block to person.

2. Description of the Related Art

Human Capital Management (HCM) systems are computerized solutions used by enterprises to effectively manage pools of human capital. HCMs are commonly integrated into a broader suit of Enterprise Resource Planning (ERP) applications that integrate information from a diverse set of applications into a singular database. One prime example of an ERP solution is "mySAP" or "SAP R/3" offered by SAP.

One function of HCM systems is to match human capital, such as employees, with positions so as to make the best possible use of available resources. ERP solutions have traditionally relied on rigid rules to keep key data well managed. As ERPs have evolved, methods have been devised to expand ERP flexibility and thereby enhance user friendliness and customization without compromising effectiveness. However, there is a continuing need to add flexibility while preserving and/or enhancing ERP effectiveness.

SUMMARY

A method for matching an object with a set of qualifications to an object With a set of requirements includes examining the object with the set of qualifications to produce a list of qualifications without a hierarchy, removing duplicate qualifications, and matching list of qualifications without a hierarchy with removed duplicates to the set of qualifications.

A method for matching a person represented by a person object within a database to a position represented by a position object, having a hierarchy of qualifications, within the database includes examining the position object to determine a flattened list of qualifications, classifying each qualification of the flattened list of qualifications according to the level on the hierarchy of qualifications each particular qualification was in, determining a level of proficiency associated with each of the qualifications, removing duplicate qualifications by comparing their hierarchy classification and level of proficiency, and matching the flattened list of qualifications with removed duplicates to a set of required qualifications associated with the person object to determine a match between the person and the position.

A system for matching an object with a set of qualifications to an object with a set of requirements includes an examining unit for examining the object with the set of qualifications to produce a list of qualifications without a hierarchy, a removing unit for removing duplicate qualifications, and a matching unit for matching list of qualifications without a hierarchy with removed duplicates to the set of qualifications.

A system for matching a person represented by a person object within a database to a position represented by a position object, having a hierarchy of qualifications, within the database includes an examining unit for examining the position object to determine a flattened list of qualifications, a classifying unit for classifying each qualification of the flattened list of qualifications according to the level on the hierarchy of qualifications each particular qualification was in, a determining unit for determining a level of proficiency associated with each of the qualifications, a removing unit for removing duplicate qualifications by comparing their hierarchy classification and level of proficiency, and a matching unit for matching the flattened list of qualifications with removed duplicates to a set of required qualifications associated with the person object to determine a match between the person and the position.

A computer system includes a processor and a program storage device readable by the computer system, embodying a program of instructions executable by the processor to perform method steps for matching an object with a set of qualifications to an object with a set of requirements. The method includes examining the object with the set of qualifications to produce a list of qualifications without a hierarchy, removing duplicate qualifications, and matching list of qualifications without a hierarchy with removed duplicates to the set of qualifications.

A computer system includes a processor, and a program storage device readable by the computer system, embodying a program of instructions executable by the processor to perform method steps for matching a person represented by a person object within a database to a position represented by a position object. The method includes examining the position object to determine a flattened list of qualifications, classifying each qualification of the flattened list of qualifications according to the level on the hierarchy of qualifications each particular qualification was in, determining a level of proficiency associated with each of the qualifications, removing duplicate qualifications by comparing their hierarchy classification and level of proficiency, and matching the flattened list of qualifications with removed duplicates to a set of required qualifications associated with the person object to determine a match between the person and the position.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Figure 1:
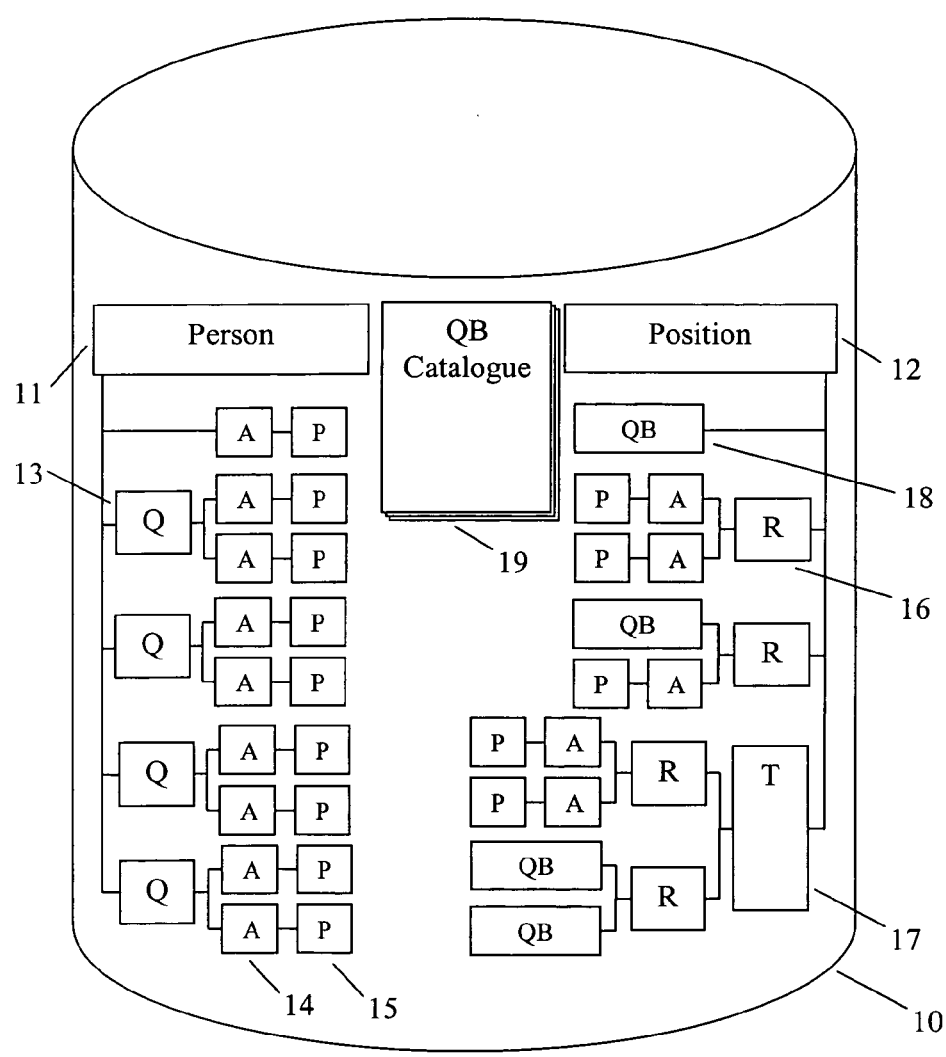
FIG. 1 shows a hierarchy diagram showing a database used to store information pertinent to both the human capital at the qualification side and the positions at the requirements side according to an embodiment of the present disclosure.

In describing the preferred embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

One important feature of the HCM is to match positions with human capital (people), such as employees. Human capital is described according to various qualifications and positions are described according to various requirements. Therefore, in matching human capital to positions, qualifications are compared against requirements.

A database may be used to store information pertinent to both the human capital at the qualification side and the positions at the requirements side. FIG. 1 shows a hierarchy diagram showing a database used to store information pertinent to both the human capital at the qualification side and the positions at the requirements side according to an embodiment of the present disclosure. The database 10 may be populated by one or more hierarchical objects. On the qualification side, each person, for example, an employee or other source of human capital, may be represented by a person object 11. The person object 11 may have one or more associated qualification objects 13. A qualification object 13 may represent a specific productive feature, for example, skills, for that person, for example, the ability to write computer programs. Each qualification object 13 may include attributes 14 and/or associated proficiencies 15. An attribute 14 may be a qualitative skill, such as fluency with C++. A proficiency 15 may be a quantitative assessment associated with a given attribute. For example, a number on the scale of 1 to 10 or a simple yes/no scale. For example, a given person object "John Smith" may have an associated qualification object comprising the attribute object "fluency with C++" and a proficiency object of "7". A proficiency may be a customization of an otherwise predefined grouping. For example, two people may share a qualification but have a different proficiency.

As discussed above, when populating the person object 11 with qualification objects 13, it may be convenient to use one or more qualification groups. Each qualification group may represent one or more qualification objects 13. Qualification groups may be used to facilitate data entry, organization and accuracy in programming the person objects 11. Qualification groups may be used to facilitate expression of sets of qualifications that commonly accompany one another. For example, there may be a "software design" qualification group that includes a set of attributes that are commonly associated with one who is capable of designing software.

Similarly, on the requirements side, each position may be represented by a position object 12. The position object 12 may have one or more associated requirement objects 16. Each requirement object 16 may represent a particular set of productive features, for example, skills, that are believed to be important for effectively filling the position. Each requirement object 16 may include attributes 14 and/or associated proficiencies 15.

A position object 12 may also have one or more associated task objects 17. Each task object 17 may include one or more requirement objects 16 that may together define a certain sort of responsibility that someone in the given position would have to fulfill. For example, a "software design manager" position object may include task objects such as "personnel management" and "software design." Each task object may then include one or more attributes and/or proficiencies. For example, the "personnel management" task may include a "leadership" attribute with an associated proficiency of 8 and an "organization" attribute with an associated proficiency of 7.

A job object is a generic definition of a position. One or more jobs may be used to more easily define a position object by potentially reducing the number of qualifications and tasks need not be explicitly applied to the position. To accomplish this, each job object may have one or more qualifications and/or tasks associated with it. When applied to a position object, the position object inherits the objects associated with the job objects.

In matching people to positions, a process called requirements analyzing may be executed. In requirements analyzing, the attributes and proficiencies of the various people are compared to the attributes and proficiencies of the various positions. For example, a "software engineer" position object with an associated requirement object with an associated attribute object "fluency with C++" and an associated proficiency object of "7" may be matched to a person object with an associated attribute object "fluency with C++" and an associated proficiency object of "7."

Dynamic Qualifications Blocks

Embodiments of the present disclosure may utilize dynamic qualifications blocks to facilitate the population person objects and/or to enhance the effectiveness of the ERP. A dynamic qualification block is a basket of qualification objects, for example, including attributes and/or associated proficiencies.

Qualification groups, as described above, may be used to define a qualification catalogue. The qualification catalogue may be used to define the composition of objects such as qualifications. Qualification groups may be used independent of objects, e.g., qualification groups may not be associated directly to an object.

Dynamic qualification blocks 18 differ from qualification groups in that qualification blocks can be assigned directly to objects, for example, position objects, job objects and/or task objects. Qualification blocks do not define qualifications as qualification groups do.

Figure 2:
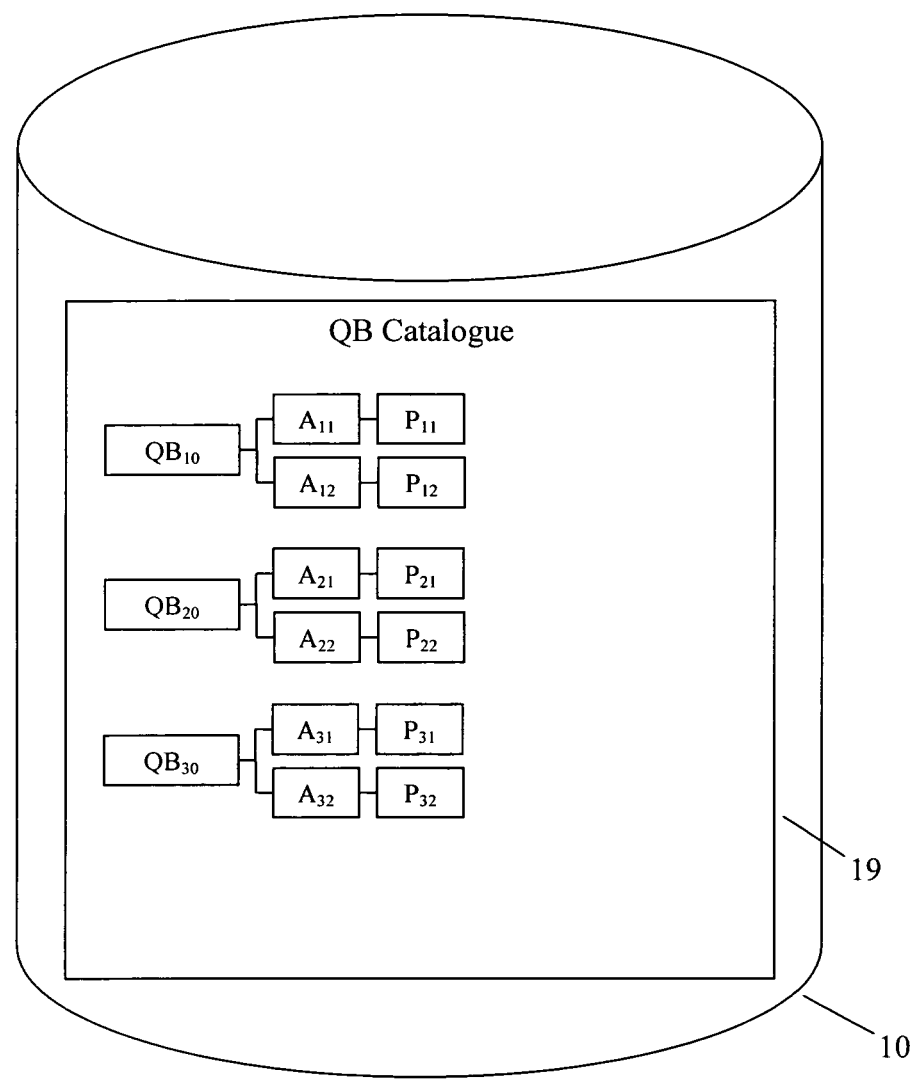
FIG. 2 shows the qualification block catalogue of FIG. 1 according to an embodiment of the present disclosure.

Qualification blocks may be assigned, for example on the requirements side, to positions, tasks and jobs. While dynamic qualification blocks may be assigned to an object, they need not be stored directly to the database in association with the person object. Definitions for dynamic qualification blocks may be stored in a qualification block catalogue that may be stored in the database. FIG. 2 shows the qualification block catalogue of FIG. 1 according to an embodiment of the present disclosure. When a dynamic qualification block 18 is associated with an object, for example a person object, only the qualification objects that are presently associated with the dynamic qualification block are stored to the database 20 in association with the person object. Therefore, if dynamic qualification blocks 18 are modified or deleted, the qualifications associated with each person object remain accurate without additional maintenance procedures.

The qualification block catalogue 19 may contain definitions of a plurality of qualification blocks (QB), for example, $QB_{10}$, $QB_{20}$ and $QB_{30}$. The definitions may indicate, for example, which attributes and qualifications are associated with each qualification block. For example, $QB_{10}$ may be defined as containing attribute $A_{11}$, proficiency $P_{11}$, attribute $A_{12}$ and proficiency $P_{12}$. $QB_{20}$ may be defined as containing attribute $A_{21}$, proficiency $P_{21}$, attribute $A_{22}$ and proficiency $P_{22}$. The other qualification blocks, for example, $QB_{20}$ and $QB_{30}$, may be similarly defined.

When a person object is displayed, the qualifications associated with that person may be analyzed according to the then existing dynamic qualification blocks and where appropriate, dynamic qualification blocks may be displayed in place of their constituent qualifications.

Embodiments of the present disclosure may also allow for partial qualification block fulfillment whereby when a person has some but not all qualifications necessary to make up a qualification block, that qualification block may be displayed or otherwise used along with an indication that the qualification block is partial. For example, a percentage indicating the degree to which the qualification block has been filled may be displayed.

Each qualification associated with the qualification blocks may have its own independent proficiencies. It is not required that proficiencies be applied to all qualifications associated with a qualifications block.

Requirements Analyzing

Requirements analyzing is the process of matching the requirements of a position with the qualifications of a person. Requirements analyzing traditionally utilizes a ridged approach where the hierarchy of the position object is rigidly compared to the hierarchy of the person object. As discussed above, the position object may have one or more associated tasks and each task may have one or more associated qualifications. Each qualification may then have an associated proficiency. Similarly, the person object may have one or more associated qualification groups or blocks, each with one or more associated qualifications. Each qualification may then have an associated proficiency.

Because the hierarchy of the position and the hierarchy of the person are rigidly compared in this hierarchical evaluation path, position tasks in their entirety are compared against person qualification blocks or groups in their entirety and unless the person has a group or block that exactly matches a task, a match is not made. Therefore, the traditional system suffers from the disadvantage that a person possessing all of the requisite qualifications to satisfy a particular position may not match to that position because the person's qualifications may be arranged in groups or blocks that do not exactly correspond to the tasks of the position.

Moreover, in the traditional system, proficiency levels are ignored as only the qualification groups or blocks are considered. Also, the traditional system relies on the hierarchies of position objects being commonly arranged as position objects having associated task objects having associated qualification objects. If a task object of a position object had one or more associated task objects each with associated qualification objects, then that position object could not be effectively matched using the hierarchical evaluation path.

Figure 3:
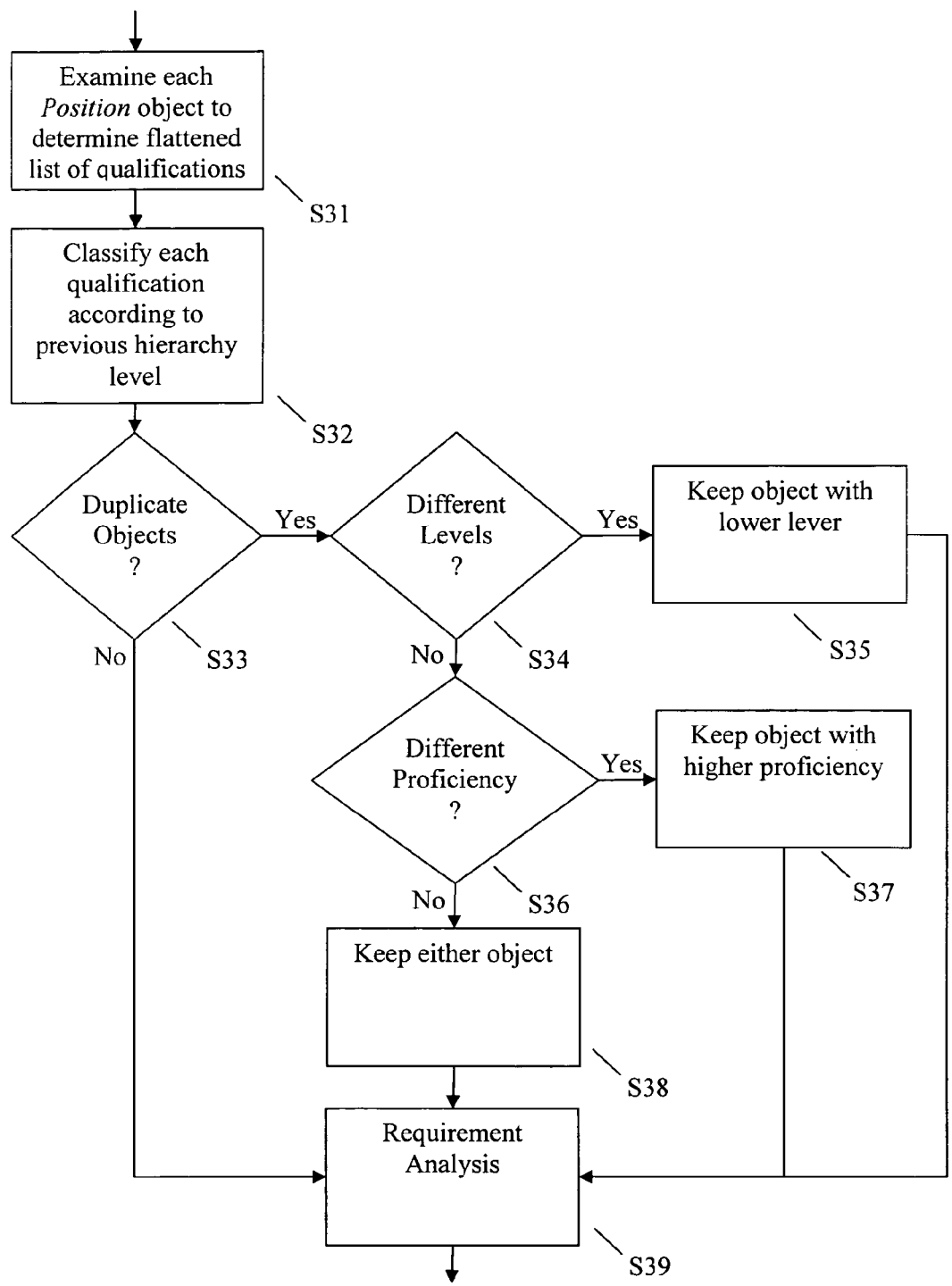
FIG. 3 is a flow chart showing a method for performing requirement analysis according to an embodiment of the present disclosure.

In embodiments of the present disclosure, a flexible and customizable evaluation path is used. FIG. 3 is a flow chart showing a method for performing requirement analysis according to an embodiment of the present disclosure. Each position object is examined to determine a flat list of all qualifications regardless of where they appear in the hierarchy (Step S31). The requirements may then be classified by their relative hierarchy level from the root object (Step S32). For example, if a qualification is directly associated with a position then it is given a classification of "1." Whereas, if a qualification is within a task which is within a task which is within the position, then the qualification is given a classification of "3." Under this approach, the lower the classification number, the closer the qualification is to the root.

In analyzing the position object, certain qualifications may appear more than once (Step S33). In these cases (Yes, Step S33), it may be determined whether the similar objects have different classification numbers (Step S34). If they do (Yes, Step S34) then the qualification with the lesser classification number remains and the others are not considered (Step S35) then the requirement analysis may continue using the flattened list of qualifications (Step S39). If there are no duplicate objects (No, Step S33) then the requirement analysis may continue using the flattened list of qualifications (Step S39).

However, if there are duplicate objects (Yes, Step S33) and the levels are not different (No, Step S34) then it may be determined whether there is a difference in the proficiency levels associated with the duplicate objects (Step S36). If there are differences in the proficiency levels associated with the duplicate objects (Yes, Step S36) then the object with the highest proficiency is kept and the rest are discarded (Step S37) then the requirement analysis may continue using the flattened list of qualifications (Step S39). However, if there are no differences in the proficiency levels (No, Step S36) then the objects are functionally identical and one may be kept and the others discarded (Step S38) then the requirement analysis may continue using the flattened list of qualifications (Step S39).

When performing requirements analyzing, the qualifications of the position may be compared directly to the qualifications of the person. Qualifications will not fail to match simply because the hierarchies may differ. The classification numbers and the proficiency values of the qualifications may then factor into determining the relative strength of a match between person and position according to a predetermined weight.

Where no single person object contains qualifications matches for all of the qualifications associated with the position object, a most-capable person object may be determined, for example, by comparing sub-groupings such as qualifications blocks and/or tasks.

Embodiments of the present disclosure also allow for greater freedom in defining the position object. For example, a position object may have associated tasks which may themselves have associated tasks. It may also be possible for a task to have an associated position.

Figure 4:
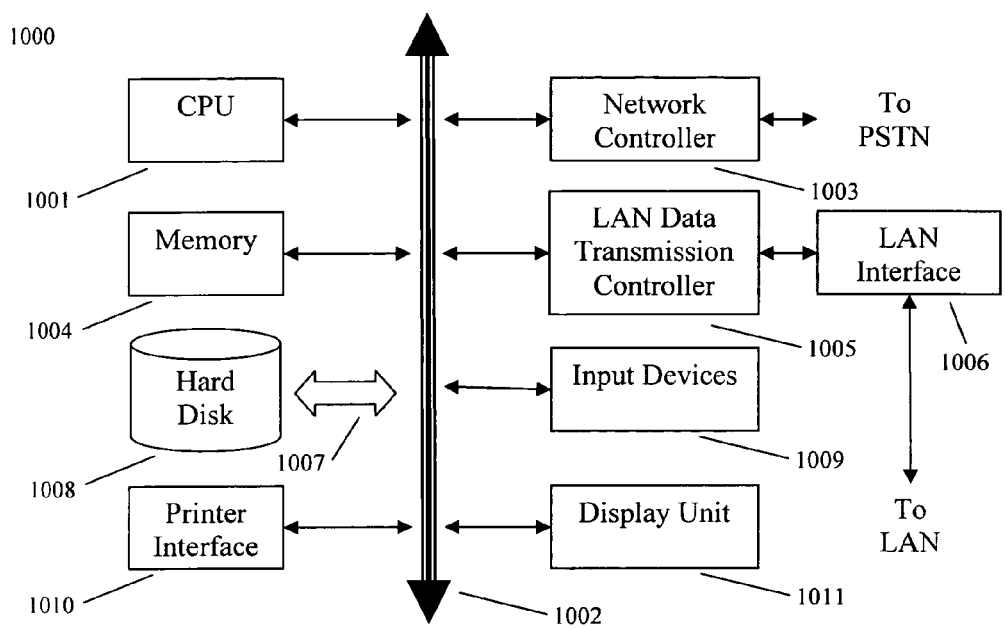
FIG. 4 shows an example of a computer system capable of implementing the method and apparatus according to embodiments of the present disclosure.

FIG. 4 shows an example of a computer system which may implement the method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

The above specific embodiments are illustrative, and many variations can be introduced on these embodiments without departing from the spirit of the disclosure or from the scope of the appended claims. For example, elements and/or features of different illustrative embodiments may be combined with each other and/or substituted for each other within the scope of this disclosure and appended claims.

What is claimed is:

1. A computer-implemented method for matching a position represented by a position object having a first set of qualifications arranged in a hierarchical structure, to a person represented by a person object, wherein the position object is organized as a hierarchical structure having the position object as a root and including requirements and tasks having requirements, each requirement further including a plurality of qualifications of the each requirement, said method comprising:

examining, by a computer, the position object having the first set of qualifications arranged in the hierarchical structure, and determining a relative hierarchy level of each of the qualifications from the position object;

assigning to each qualification, by the computer, a classification number indicating the relative hierarchy level of the qualification;

producing, by the computer, a flat list of qualifications from the hierarchical structure, each qualification being associated with its corresponding classification number;

removing, by the computer, duplicate qualifications from the flat list, wherein duplicate qualifications having higher classification numbers are removed; and responsive to the removal of the duplicate qualifications, matching the flat list of qualifications to qualifications from a second set of qualifications associated with the person object to determine whether the person is a match for the position.

2. The method of claim 1, wherein the step of removing duplicate qualifications comprises:

determining a level of proficiency associated with each of the qualifications, wherein for duplicate qualifications having the same hierarchy level, a determination is made whether there is a difference in proficiency levels associated with the duplicate qualifications; and for duplicate qualifications having different proficiency levels, removing the duplicate qualifications having a lower level of proficiency.

3. A computer-implemented method for matching a person represented by a person object within a database, to a position represented by a position object having a hierarchy of qualifications within the database, wherein the position object is organized as a hierarchical structure having the position object as a root and including requirements and tasks having requirements, each requirement further including a plurality of qualifications of the each requirement, the method comprising:

examining, by a computer, the position object having the hierarchical structure of qualifications, and determining a relative hierarchy level of each of the qualifications in the hierarchical structure of qualifications from the position object;

assigning to each qualification, by the computer, a classification number indicating the relative hierarchy level of the qualification;

determining, by the computer, a flattened list of qualifications from the hierarchical structure, each qualification being associated with its corresponding classification number;

determining, by the computer, a level of proficiency associated with each of the qualifications;

removing, by the computer, duplicate qualifications from the flattened list of qualifications, wherein duplicate qualifications having a classification further from the position object are removed and wherein for duplicate qualifications having the same hierarchy level, a determination is made whether there is a difference in proficiency levels associated with the duplicate qualifications;

for duplicate qualifications having different proficiency levels, removing the duplicate qualification having a lower level of proficiency; and matching the flattened list of qualifications with removed duplicates to a set of required qualifications associated with the person object to determine a match between the person and the position.

4. A computer storage medium including computer executable code for providing a system for matching a position represented by a position object having a first set of qualifications arranged in a hierarchical structure, to a person represented by a person object, wherein the position object is organized as a hierarchical structure having the position object as a root and including requirements and tasks having requirements, each requirement further including a plurality of qualifications of the each requirement, said computer executable code comprising:

code for examining the position object having the first set of qualifications arranged in the hierarchical structure, and determining a relative hierarchy level of each of the qualifications from the position object;

code for assigning to each qualification a classification number indicating the relative hierarchy level of the qualification;

code for producing a flat list of qualifications from the hierarchical structure, each qualification being associated with its corresponding classification number;

code for removing duplicate qualifications from the flat list, wherein duplicate qualifications having higher classification numbers are removed; and code for, responsive to the removal of the duplicate qualifications, matching the flat list of qualifications to qualifications from a second set of qualifications associated with the person object to determine whether the person is a match for the position.

5. The computer storage medium of claim 4, wherein the code for removing duplicate qualifications comprises:

code for determining a level of proficiency associated with each of the qualifications, wherein for duplicate qualifications having the same hierarchy level, a determination is made whether there is a difference in proficiency levels associated with the duplicate qualifications; and for duplicate qualifications having different proficiency levels, code for removing the duplicate qualifications having a lower level of proficiency.

6. A system for matching a person represented by a person object within a database, to a position represented by a position object having a hierarchy of qualifications within the database, wherein the hierarchy has the position object as a root and including requirements and tasks having requirements, each requirement further including a plurality of qualifications of the each requirement, the system comprising:

an examining unit for examining the position object having the hierarchy of qualifications, and determining a relative hierarchy level of each of the qualifications in the hierarchy of qualifications from the position object;

an assigning unit for assigning to each qualification a classification number indicating the relative hierarchy level of the qualification;

a first determining unit for determining a flattened list of qualifications from the hierarchical structure, each qualification being associated with its corresponding classification number;

a second determining unit for determining a level of proficiency associated with each of the qualifications;

a removing unit for removing duplicate qualifications from the flattened list of qualifications, wherein duplicate qualifications having a classification further from the position object are removed and wherein for duplicate qualifications having the same hierarchy level, a determination is made whether there is a difference in proficiency levels associated with the duplicate qualifications;

for duplicate qualifications having different proficiency levels, removing the duplicate qualifications having a lower level of proficiency; and a matching unit for matching the flattened list of qualifications with removed duplicates to a set of required qualifications associated with the person object to determine a match between the person and the position.

7. A computer system comprising:

a processor; and a program storage device readable by the computer system, embodying a program of instructions executable by the processor to perform method steps for matching a position represented by a position object having a first set of qualifications arranged in a hierarchical structure to a person represented by a person object, wherein the position object is organized as a hierarchical structure having the position object as a root and including requirements and tasks having requirements, each requirement further including a plurality of qualifications of the each requirement, the method comprising:

examining the position object having the set of qualifications arranged in the hierarchical structure, and determining a relative hierarchy level of each of the qualifications from the position object;

assigning to each qualification, by the computer system, a classification number indicating the relative hierarchy level of the qualification;

producing a flat list of qualifications from the hierarchical structure, each qualification being associated with its corresponding classification number;

removing duplicate qualifications from the flat list, wherein duplicate qualifications having higher classification numbers are removed; and responsive to the removal of the duplicate qualifications, matching the flat list of qualifications to qualifications from a second set of qualifications associated with the person object to determine whether the person is a match for the position.

8. The computer system of claim 7, wherein the step of removing duplicate qualifications comprises:

determining a level of proficiency associated with each of the qualifications, wherein for duplicate qualifications having the same hierarchy level, a determination is made whether there is a difference in proficiency levels associated with the duplicate qualifications; and for duplicate qualifications having different proficiency levels, removing the duplicate qualifications having a lower level of proficiency.

9. A computer system comprising:

a processor; and a program storage device readable by the computer system, embodying a program of instructions executable by the processor to perform method steps for matching a person represented by a person object within a database, to a position represented by a position object having a hierarchy of qualifications within the database, wherein the position object is organized as a hierarchical structure having the position object as a root and including requirements and tasks having requirements, each requirement further including a plurality of qualifications of the each requirement, said method comprising:

examining the position object having the hierarchy of qualifications, and determining a relative hierarchy level of each of the qualifications in the hierarchy of qualifications from the position object;

assigning to each qualification a classification number indicating the relative hierarchy level of the qualification;

determining a flattened list of qualifications from the hierarchical structure, each qualification being associated with its corresponding classification number;

determining a level of proficiency associated with each of the qualifications;

removing duplicate qualifications from the flattened list of qualifications, wherein duplicate qualifications having a classification further from the position object are removed and wherein for duplicate qualifications having the same hierarchy level, a determination is made whether there is a difference in proficiency levels associated with the duplicate qualifications;

for duplicate qualifications having different proficiency levels, removing the duplicate qualifications having a lower level of proficiency; and matching the flattened list of qualifications with removed duplicates to a set of required qualifications associated with the person object to determine a match between the person and the position.

* * * * *